US012649894B2

(12) United States Patent
Xing et al.

(10) Patent No.: US 12,649,894 B2
(45) Date of Patent: Jun. 9, 2026

(54) CLEANING SOLUTION FOR HIGH-YIELD-STRESS CERAMIC MATERIAL 3D PRINTING BLANK, PREPARATION METHOD THEREFOR AND USE THEREOF

(71) Applicant: SOOCHOW UNIVERSITY, Suzhou (CN)

(72) Inventors: Zhanwen Xing, Suzhou (CN); Wenli Li, Suzhou (CN); Weiwei Liu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 347 days.

(21) Appl. No.: 18/036,878

(22) PCT Filed: May 6, 2022

(86) PCT No.: PCT/CN2022/091241
§ 371 (c)(1),
(2) Date: Nov. 14, 2023

(87) PCT Pub. No.: WO2022/233324
PCT Pub. Date: Nov. 10, 2022

(65) Prior Publication Data
US 2024/0327760 A1     Oct. 3, 2024

(30) Foreign Application Priority Data

May 6, 2021     (CN) ......................... 202110492415.5

(51) Int. Cl.
| | |
|---|---|
| *C11D 7/00* | (2006.01) |
| *B28B 11/22* | (2006.01) |
| *B33Y 40/20* | (2020.01) |
| *C11D 7/26* | (2006.01) |
| *C11D 7/32* | (2006.01) |
| *B08B 3/02* | (2006.01) |
| *B08B 3/08* | (2006.01) |
| *B08B 3/12* | (2006.01) |
| *B28B 1/00* | (2006.01) |

(52) U.S. Cl.
CPC .............. *C11D 7/266* (2013.01); *B28B 11/22* (2013.01); *B33Y 40/20* (2020.01); *C11D 7/267* (2013.01); *C11D 7/3281* (2013.01); *B08B 3/02* (2013.01); *B08B 3/08* (2013.01); *B08B 3/12* (2013.01); *B28B 1/001* (2013.01)

(58) Field of Classification Search
CPC ....... C11D 7/266; C11D 7/267; C11D 7/3281; C11D 2111/24; C11D 11/0094; B28B 11/22; B28B 1/001; B33Y 40/20; B08B 3/02; B08B 3/08; B08B 3/12; B08B 3/024
USPC ......................................................... 510/238
See application file for complete search history.

(56) References Cited

FOREIGN PATENT DOCUMENTS

| | | | | | |
|---|---|---|---|---|---|
| CN | 1724260 A | * | 1/2006 | ........... | C11D 3/2093 |
| CN | 1900248 A | | 1/2007 | | |
| CN | 107266957 A | | 10/2017 | | |
| CN | 107921703 A | | 4/2018 | | |
| CN | 108300614 A | * | 7/2018 | ............. | C11D 7/261 |
| CN | 111559174 A | * | 8/2020 | ........... | C11D 3/2093 |
| CN | 113211613 A | | 8/2021 | | |
| CN | 113234549 A | | 8/2021 | | |
| WO | WO 2018222395 A1 | * | 12/2018 | ............. | C11D 7/266 |

* cited by examiner

*Primary Examiner* — Eisa B Elhilo
(74) *Attorney, Agent, or Firm* — SZDC Law PC

(57) ABSTRACT

Disclosed in the present invention are a cleaning solution for a high-yield-stress ceramic material 3D printing blank, a preparation method therefor and the use thereof. The cleaning solution is composed of a main cleaning agent and an auxiliary cleaning agent, wherein the main cleaning agent is isobornyl acrylate (IBOA), N-acryloylmorpholine (ACMO), hydroxyethyl methacrylate (HEMA), 3-ethyl-3-oxetanemethanol (EHO), or a combination thereof. According to the cleaning solution of the present invention, ultrasonic cleaning or pressure spraying is used, such that the problem of cleaning the high-yield-stress ceramic material 3D printing blank is effectively solved. The present invention is not only simple to clean, but also has a good effect and excellent efficiency.

5 Claims, 3 Drawing Sheets

CLEANING SOLUTION FOR HIGH-YIELD-STRESS CERAMIC MATERIAL 3D PRINTING BLANK, PREPARATION METHOD THEREFOR AND USE THEREOF

This application is the National Stage Application of PCT/CN2022/091241, filed on May 6, 2022, which claims priority to Chinese Patent Application No. 202110492415.5, filed on May 6, 2021, which is incorporated by reference for all purposes as if fully set forth herein.

TECHNICAL FIELD

The present invention relates to the field of additive manufacturing (3D printing) technology, in particular to the cleaning liquid for 3D printing green body of high-yield-stress ceramic material and its preparation method.

BACKGROUND OF INVENTION

The principle of ceramic stereolithography 3D printing is to spread a printing material containing ceramic powder, UV monomers and/or oligomers, dispersants, photoinitiators, and other additives into a thin layer. UV laser selectively cures the layer based on its slice model. After scanning, the above steps are repeated until the part is printed. Ceramic stereolithography 3D printing technology has become a typical technology in the field of ceramic 3D printing due to its ability to prepare ceramic parts of complex shapes with high surface smoothness, uniform microstructure, and excellent mechanical properties. Ceramic stereolithography 3D printing has great advantages in the construction of ceramic parts of complex shapes, especially in adding non-contact support to the parts with high yield stress to ensure the surface quality of the parts. However, the disadvantage is that the high-yield-stress ceramic materials on the surface of the parts and inside the complex structure are difficult to be removed, and it makes cleaning difficult, especially for micro/porous complex structures. And the existing technology cannot provide effective cleaning solutions.

Technical Problems

In order to solve the above technical problem, the present invention proposes cleaning liquid for 3D printing green body of high-yield-stress ceramic materials and its preparation method, and further discloses a method for using the cleaning liquid to clean the 3D printing body of high-yield-stress ceramic materials. When the cleaning liquid of the present invention contacts with a high-yield-stress ceramic material, it damages its spatial three-dimensional net structure, enabling the components originally limited in the stereoscopic mesh structure to flow, thereby achieving the goal of facilitating the removal of high-yield-stress ceramic material from the surface and internal structure of the 3D printing green body.

Technical Solution

To achieve the above objective, the technical solution of the present invention is as follows: the cleaning liquid for 3D printing green body of high-yield-stress ceramic material is composed of main cleaning agent and auxiliary cleaning agent; The main cleaning agent is one or a combination of isobornyl acrylate (IBOA), N-acrylylmorpholine (ACMO), 2-Hydroxyethyl methacrylate (HEMA), and 3-ethyl-3-oxe-tanemethanol (EHO).

The present invention also proposes a method for preparing the cleaning liquid for 3D printing green body of high-yield-stress ceramic material. At room temperature, the main cleaning agent is mixed with the auxiliary cleaning agent to obtain the cleaning liquid for 3D printing green body of high-yield-stress ceramic material.

In the cleaning liquid for 3D printing green body of high-yield-stress ceramic material of the present invention, the weight of the auxiliary cleaning agent is 0-3% of the weight of the main cleaning agent, excluding 0; preferably, the weight of the auxiliary cleaning agent is 0.4-1.5% of that of the main cleaning agent, with the most preferably 0.6-0.9%.

Furthermore, the auxiliary cleaning agent is one or a combination of Dispers 750 W, Dispers 655, Tego 688, and Tego 755.

The present invention utilizes the cleaning liquid for 3D printing green body of high-yield-stress ceramic material, and uses spray or ultrasonic methods for cleaning. Specifically, when the ultrasonic cleaning method is used, the cleaning liquid for 3D printing green body of high-yield-stress ceramic material is placed in the ultrasonic cleaning equipment, and then the 3D printing green body of high-yield-stress ceramic material is immersed in the cleaning liquid, and then the ultrasonic wave is activated for cleaning; when the spray cleaning method is used, the 3D printing green body of high-yield-stress ceramic material is placed on the cleaning tank or cleaning table, and a gas-liquid mixing spray gun loaded with the cleaning liquid is used for pressurized spraying.

In the present invention, the high-yield-stress ceramic material is used to obtain the 3D printing green body of ceramic material by conventional 3D printing and it is the existing product; the yield stress of high-yield-stress ceramic material is 50-2,000 Pa. At present, there are existing technologies for cleaning 3D printing green bodies, but they are all aimed at slurry or low-yield-stress ceramic materials, which are different from high-yield-stress ceramic materials in terms of technology. Even if the slurry viscosity is high, it still belongs to the fluid. The morphology, physical structure, and chemical properties of low-yield-stress ceramic materials and high-yield-stress ceramic materials are different. In particular, the existing cleaning methods use phase solvents to dissolve slurry. To achieve the purpose of cleaning, it is also necessary to add small molecule solvents (mostly anhydrous ethanol) that reduce the cleaning viscosity. This cleaning principle selects the content of the cleaning liquid based on the composition of the slurry. For high-yield-stress ceramic materials, they have significantly different spatial stereoscopic mesh structure, which cannot be effectively cleaned using existing dissolution methods. The present invention creatively discloses the cleaning liquid for 3D printing green body of high-yield-stress ceramic material, which adopts a different technical idea from slurry cleaning to achieve good cleaning effect and short cleaning time. And it is not limited by the composition of high-yield-stress material, and does not require viscosity reducing solvents such as anhydrous ethanol and isobutyl acetate, which cannot be achieved and expected by existing technologies.

Beneficial Effects

Through the above technical solution, the cleaning liquid for 3D printing green body of high-yield-stress ceramic material of the present invention is obtained by mixing the main cleaning agent and the auxiliary cleaning agent. When the cleaning liquid comes into contact with the high-yield-stress ceramic material, it will damage the spatial stereoscopic mesh structure of the original ceramic material and the components originally limited in the stereoscopic mesh late (HEMA), and 3-ethyl-3-oxetanemethanol (EHO); The auxiliary cleaning agent is one or a combination of Dispers 750 W, Dispers 655, Tego 688, and Tego 755 from Tego.

Furthermore, in the cleaning liquid for 3D printing green body of high-yield-stress ceramic material, the weight of the auxiliary cleaning agent is 0-3% of the weight of the main cleaning agent, excluding 0; preferably, the weight of the auxiliary cleaning agent is 0.4-1.5% of that of the main cleaning agent, with the most preferably 0.6-0.9%.

TABLE 1

| | main cleaning agent | Dosage of main cleaning agent | availiary cleaning agent | Dosage of auxiliary cleaning agent |
|---|---|---|---|---|
| Components of the cleaning liquid for 3D printing green body of ceramic material | | | | |
| Example 1 | IBOA | 10000 | Tego 688 | 80 |
| Example 2 | ACMO | 10000 | Tego 755 | 60 |
| Example 3 | HEMA/EHO | 10000 | Dispers 750W | 90 |
| Control 1 | HDDA | 10000 | Tego 688 | 80 |
| Control | IBOA | 10000 | BYK-111 | 80 |
| Control | HDDA/anhydrous ethanol | 10000 | BYK-111 | 180 |
| Existingcleaning liquid | Commercially available NW water based cleaning agent | | | |
| Example 4 | IBOA | 10000 | Tego 688 | 40 |
| Example 5 | ACMO | 10000 | Tego 755 | 120 |
| Example 6 | IBOA | 10000 | Tego 688 | 150 | structure will flow out, so it will have high cleaning efficiency without damaging the surface of the part.

EXAMPLES OF THE PRESENT INVENTION

The following is the clear and complete description of the technical solutions with the Example of the present invention. Obviously, the described Examples are only part of the Examples of the present invention, rather than all of them. All other Examples obtained by those of ordinary skill in the art without creative work based on the Examples of the present invention shall fall within the protection scope of the present invention.

The specific Examples of the invention are further described in detail below.

The cleaning liquid for 3D printing green body of high-yield-stress ceramic material is composed of main cleaning agent and auxiliary cleaning agent; The main cleaning agent is one or a combination of isobornyl acrylate (IBOA), N-acrylylmorpholine (ACMO), 2-Hydroxyethyl methacry- Note: In Example 3, the weight ratio of HEMA and EHO is 6:4; In Control 1, HDDA is 1,6-hexanediol diacrylate; In Control 3, the volume ratio of HDDA/anhydrous ethanol is 1:1.

The preparation method for the above cleaning liquid is to mix the main cleaning agent and the auxiliary cleaning agent to obtain the cleaning liquid for 3D printing green body of high-yield-stress ceramic material. And the Example is the cleaning liquid for 3D printing green body of high-yield-stress ceramic material.

Figure 1:
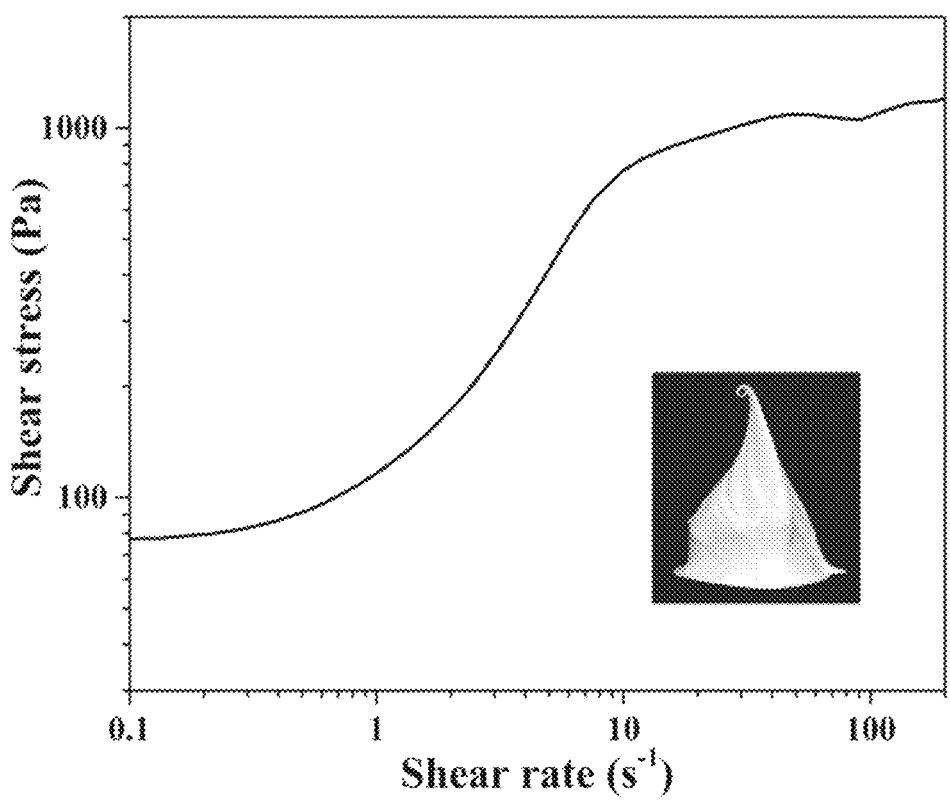
FIG. 1 shows the rheological curve of high-yield-stress ceramic material.

Application of the Example: The composition of high-yield-stress ceramic material is (mass fraction): 12 portions of HDDA (1,6-hexanediol diacrylate), 2 portions of PPTTA (Ethoxylated (5) pentaerythritol tetraacrylate), 0.5 portions of dispersant Anti-terra U100, 3 portions of DBP (dibutyl phthalate), and 82.5 portions of aluminum oxide. The above components were obtained through conventional ball milling and wetting dispersion to obtain a high yield stress (260 Pa) ceramic 3D printing material, and the rheological curve is shown in FIG. 1.

Figure 2:
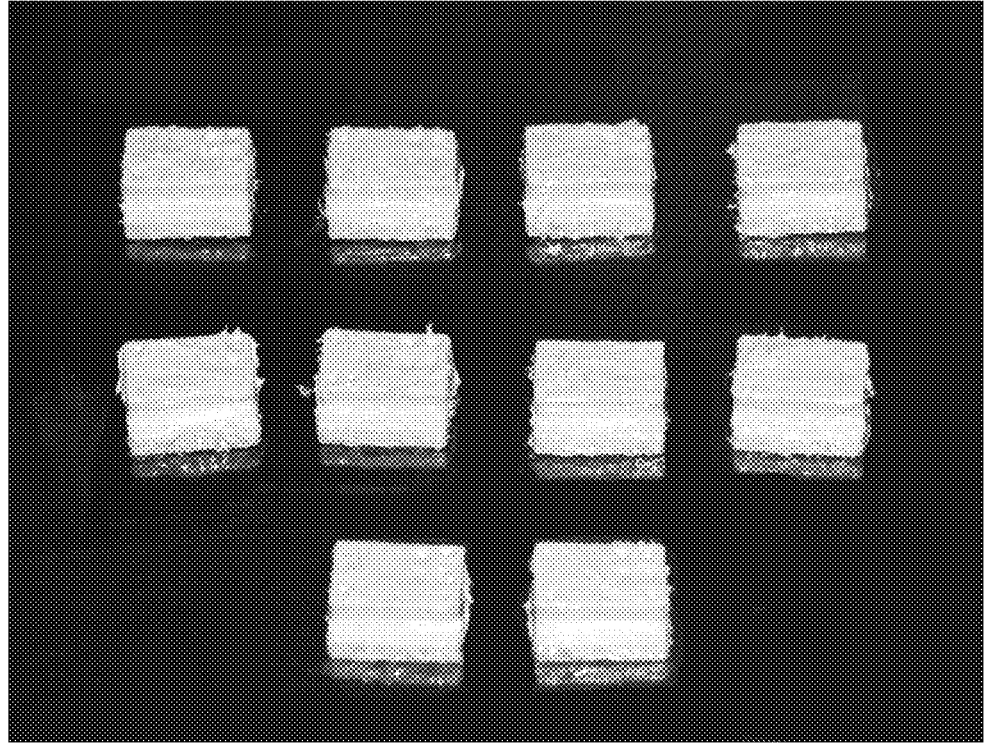
FIG. 2 shows the photo of the 3D printing green body of high-yield-stress ceramic material.

A 3D printing equipment (iAMC150, Suzhou ZRapid Technology Co., Ltd.) was used for conventional printing to obtain a 3D printing green body of high-yield-stress ceramic material, as shown in FIG. 2. There was uncured high viscosity ceramic material on the surface, and multiple sets of identical 3D printing green bodies were subjected to parallel cleaning experiments with one set uncleaned and used as a blank group for comparison, and ten of them were randomly given in FIG. 2.

TABLE 2

| | ultrasonic cleaning | | spray cleaning | |
| --- | --- | --- | --- | --- |
| | cleaning effects | surface of green body | cleaning effects | surface of green body |
| Example 1 | Completely remove | Minor damage | Completely remove | No damage |
| Example 2 | Completely remove | Minor damage | Completely remove | No damage |
| Example 3 | Completely remove | Minor damage | Completely remove | No damage |
| Control 1 | Mild residue | Moderate damage | Moderate residue | Moderate damage |
| Control 2 | Completely remove | Minor damage | Mild residue | Minor damage |
| Control 3 | A little residue | Moderate damage | Moderate residue | Moderate damage |
| Existing cleaning solution | Large amount of residue | Moderate damage | — | — |
| Example 4 | — | — | A little residue | No damage |
| Example 5 | — | — | A little residue | No damage |
| Example 6 | — | — | A little residue | Minor damage |
| IBOA | Large amount of residue | Unobserved | — | — |
| Tego 688 | No difference compared to the black group | Unobserved | — | — |

Cleaning status of each group

A conventional ultrasonic cleaning machine (JP-020S, Skymen Cleaning Equipment Shenzhen Co., Ltd.) was used for ultrasonic cleaning, with a power of 300 W, a frequency of 40 KHz, and a time of 5 minutes. The "-" in Table 2 indicates that this test was not conducted.

During the spray cleaning, a 3D printing green body of high-yield-stress ceramic material was placed on a cleaning table, and a gas-liquid mixing spray gun loaded with the cleaning liquid was used for pressurized spraying, with a pressure of 0.5 Mpa and a time of 2 minutes. The "-" in Table 2 indicates that this test was not conducted.

Effect judgment refers to the contrast effect. The uncleaned 3D printing green body of high-yield-stress ceramic material was used as contrast groups, microscopic observations were conducted on the cleaned products of each group. According to the degree of residual ceramic materials on the surface, it was divided into large residue, moderate residue, mild residue, slight residue, and complete removal; According to the degree of surface damage, it was divided into severe damage, moderate damage, minor damage, and no damage. The tests showed that there was a significant difference in the degree of cleaning effect between each group. The cleaning effects of the 3D printing products are shown in Table 2 through the further observation with a microscope.

Figure 3:
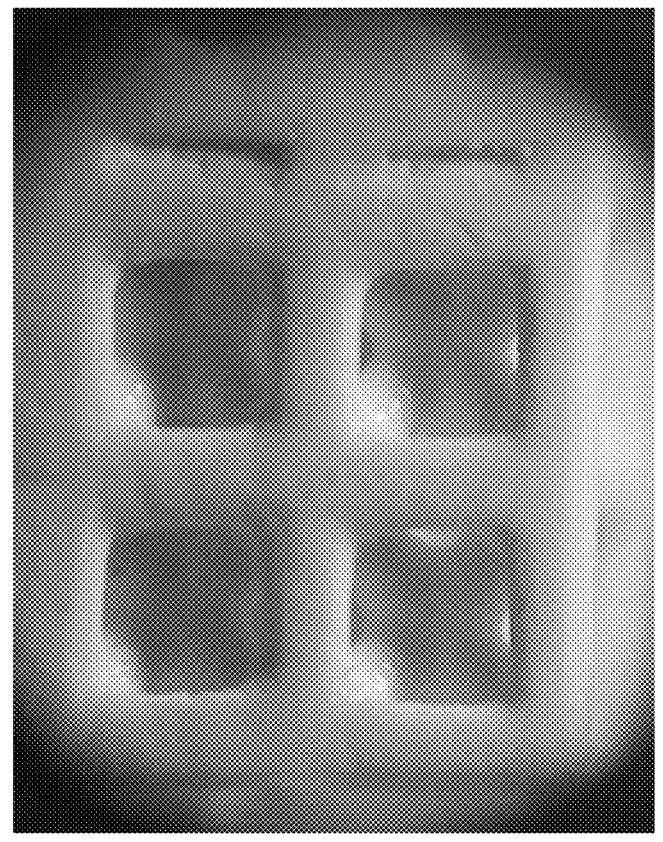
FIG. 3 shows the spray cleaning effect of the cleaning liquid in Example 1.
Figure 4:
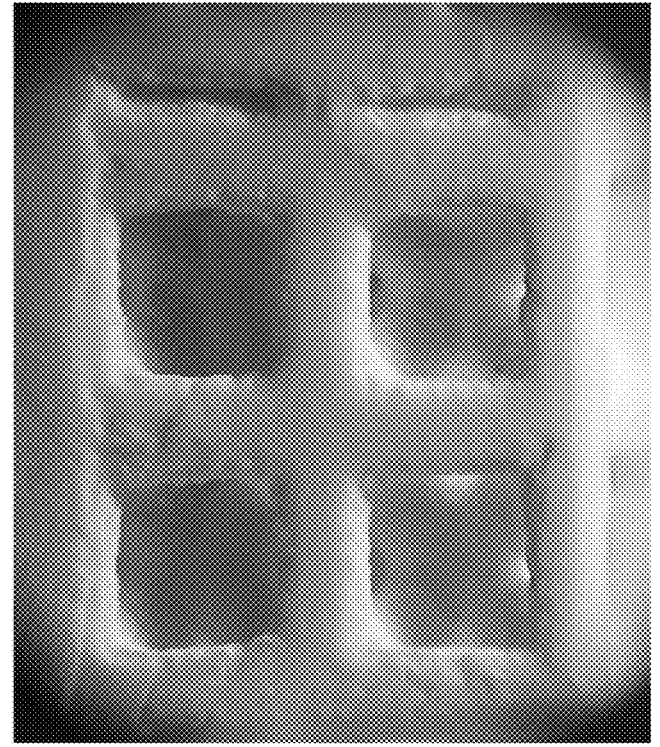
FIG. 4 shows the ultrasonic cleaning effect of the cleaning liquid in Example 1.
Figure 5:
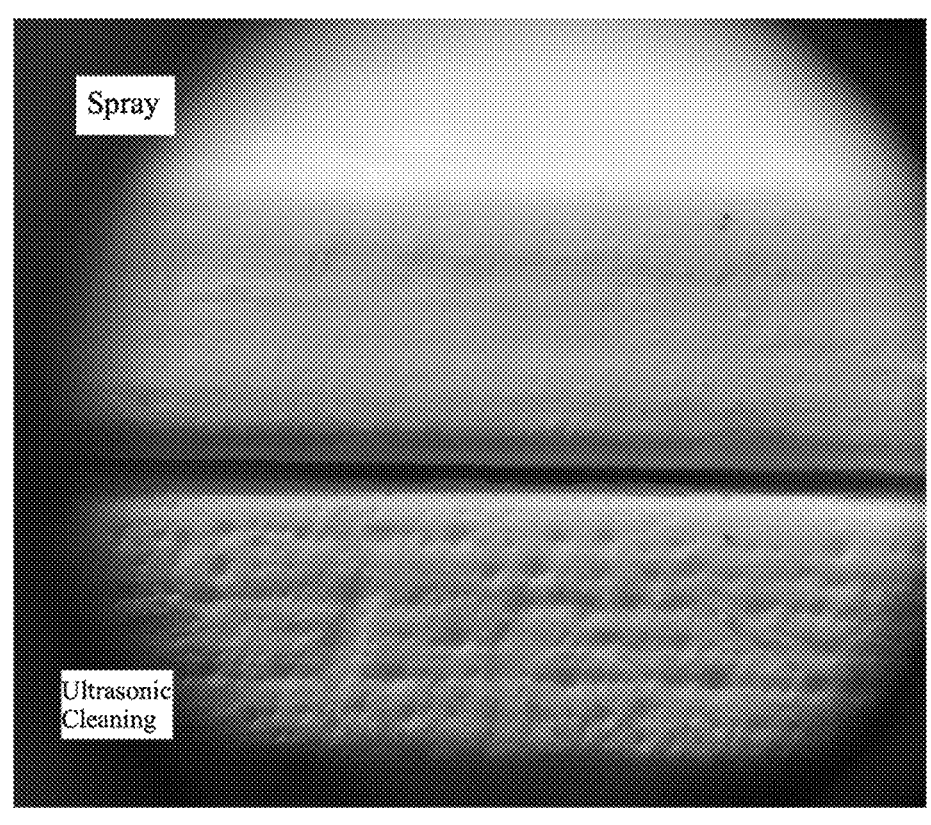
FIG. 5 shows the will flow surface effect of the cleaning liquid after spray cleaning and ultrasonic cleaning in Example 1.

As shown in FIG. 3, it can be seen from the spray cleaning effects of Example 1 that the cleaning liquid disclosed for the first time in the present invention achieved very good cleaning effects for 3D printing green body of high-yield-stress ceramic material. As shown in FIG. 4, it can be seen from the ultrasonic cleaning effects of Example 1 that the cleaning liquid disclosed for the first time in the present invention achieved good cleaning effects for 3D printing green body of high-yield-stress ceramic material. As shown in FIG. 5, it shows a micrograph of the surface after the spray and ultrasonic cleaning in Example 1. It can be seen that the surface after spray cleaning was not damaged, while the surface after ultrasonic cleaning had slight damage.

Figure 6:
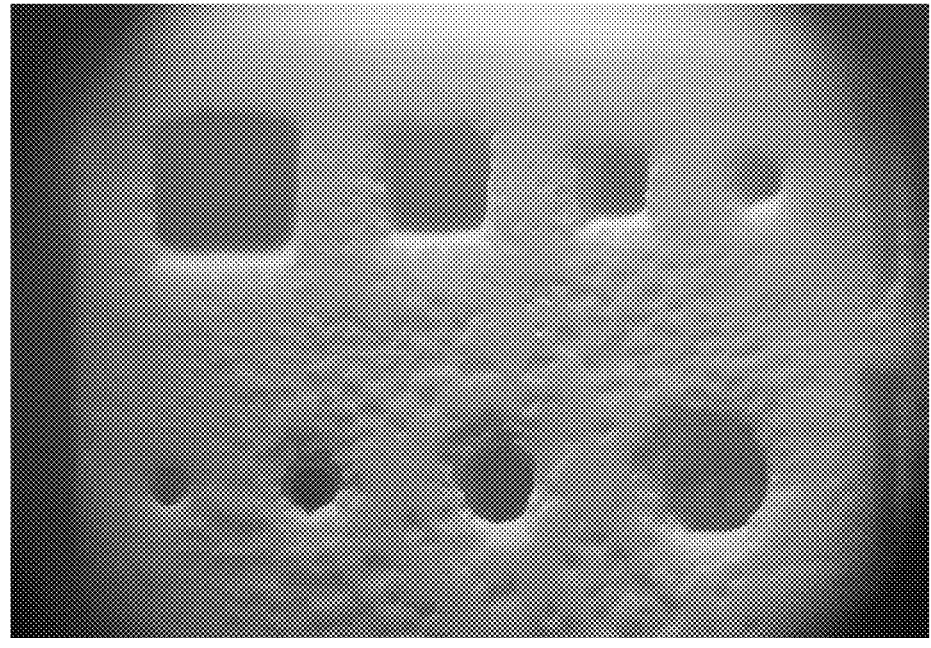
FIG. 6 shows the ultrasonic cleaning effect of the cleaning liquid in Control 3.

As shown in FIG. 6, the results of the ultrasonic cleaning in Control 3 showed significant damage. It can be seen that the change in formula had a significant impact on the cleaning effect.

The cleaning principle of the present invention for 3D printing green body of high-yield-stress ceramic material is to use the cleaning liquid mentioned above to destroy the stereoscopic mesh structure formed in the material, allowing the components originally limited in the stereoscopic mesh structure to freely flow out and circulate, thereby achieving the goal of convenient cleaning and good cleaning effect. In particular, the present invention maintains high surface quality while achieving excellent cleaning effect.

The above are only the preferred Examples of the present invention. It should be pointed out that for ordinary technical personnel in this field, several changes and improvements can be made without departing from the creative idea of the present invention. These changes and improvements should also be considered as the scope of protection of the present invention.

The invention claimed is:

1. A cleaning liquid for 3D printing green body of high-yield-stress ceramic material, consisting of a main cleaning agent and an auxiliary cleaning agent;
   wherein the main cleaning agent is isobornyl acrylate, N-acrylylmorpholine, 2-Hydroxyethyl methacrylate, 3-ethyl-3-oxetanemethanol, or a combination thereof;
   wherein the auxiliary cleaning agent is a polymeric wetting and dispersing additive; and
   wherein the weight of the auxiliary cleaning agent is 0.6-0.9% of the weight of the main cleaning agent.

2. The cleaning liquid for 3D printing green body of high-yield-stress ceramic material according to claim 1, wherein the main cleaning agent is mixed with the auxiliary cleaning agent to obtain the cleaning liquid for 3D printing green body of high-yield-stress ceramic material.

3. A preparation method of the cleaning liquid for 3D printing green body of high-yield-stress ceramic material according to claim 1, consisting of mixing the main cleaning agent with the auxiliary cleaning agent to obtain the cleaning liquid for 3D printing green body of high-yield-stress ceramic material.

4. The preparation method of the cleaning liquid for 3D printing green body of high-yield-stress ceramic material according to claim 3, wherein the mixing is carried out at room temperature.

5. The preparation method of the cleaning liquid for 3D printing green body of high-yield-stress ceramic material according to claim 4, wherein the auxiliary cleaning agent is a polymeric wetting and dispersing additive.

* * * * *